United States Patent [19]

Hiraiwa et al.

[11] 4,154,325

[45] May 15, 1979

[54] WET TYPE CLUTCH FOR TORQUE CONVERTORS

[75] Inventors: Kazuyoshi Hiraiwa, Ome; Kotei Takahashi, Tokyo, both of Japan

[73] Assignee: Nissan Motor Company, Limited, Japan

[21] Appl. No.: 814,092

[22] Filed: Jul. 8, 1977

[30] Foreign Application Priority Data

Jul. 14, 1976 [JP] Japan ................................ 51/82882

[51] Int. Cl.[2] ............................................ F16D 39/00

[52] U.S. Cl. .............................. 192/3.33; 192/109 F; 192/86

[58] Field of Search ............ 192/87.17, 109 A, 109 F, 192/85 AA, 86, 3.29, 3.3, 3.33

[56] References Cited

U.S. PATENT DOCUMENTS 3,266,608 8/1966 Lemieux ........................ 192/85 AA 3,384,214 5/1968 Wilson ............................ 192/109 F 3,612,237 10/1971 Honda ............................ 192/109 F

*Primary Examiner*—Benjamin W. Wyche

*Attorney, Agent, or Firm*—Robert E. Burns; Emmanuel J. Lobato; Bruce L. Adams

[57] ABSTRACT

An annular disc spring interposed between inner and outer pistons and located in the inner piston, in a direction parallel with a clutch disk, in series with a wall surface through which the inner and outer pistons are in slidably fitted relationship to each other. The outer piston has a central circular aperture to cut off a central portion of the outer piston, and an inner portion of each of clutch housing, clutch hub and the inner piston which is offset in the direction of the axis of the clutch and away from the outer piston to form a cavity on the inner portion of the inner piston for accommodating an inner portion of a converter cover and an end of an output shaft of an engine.

8 Claims, 1 Drawing Figure

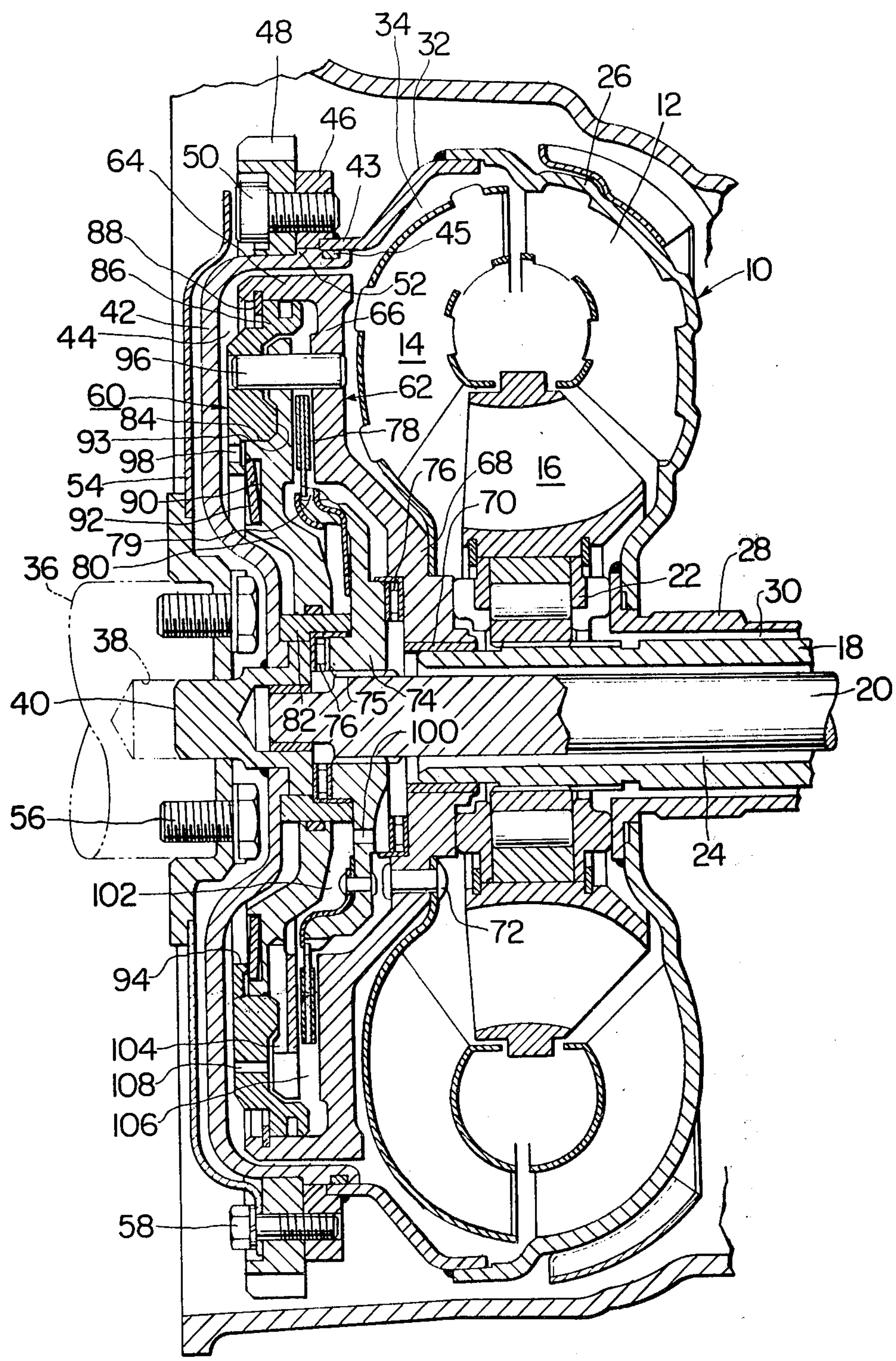
48
34
32
26
12
46
64
50
43
45
10
88
52
86
66
42
14
44
96
62
60
84
78
93
98
76
68
16
54
70
90
92
79
80
28
36
22
30
18
38
74
75
20
40
82
76
100
56
24
102
72
94
104
108
106
58

WET TYPE CLUTCH FOR TORQUE CONVERTORS

BACKGROUND OF THE INVENTION

1. Field of the Invention

The present invention relates generally to a wet type clutch which is engaged and released by a hydraulic fluid pressure alternately exerted on both sides of piston means slidably fitted in a clutch housing to provide and interrupt transmission of a torque produced by, for example, an engine to an output of a torque converter and particularly to a clutch of this type in which the piston means consists of double pistons so that the clutch is smoothly engaged.

2. Description of the Prior Art

As is well known in the art, a wet type clutch having double pistons includes an annular disc spring slanted in the form of the surface of a cone frustum which is interposed between the double pistons to urge the same away from each other. Engagement of the clutch is effected by the intermediation of the annular disc spring so that it is smoothly performed.

However, a conventional clutch of this type per se has had a length or thickness which is undesirably increased axially of the clutch owing to an unsuitable arrangement of the annular disc spring. Furthermore, when the conventional clutch is incorporated between, for example, the output shafts of an engine and a hydraulic torque converter, the axial length of the assembly is undesirably increased.

SUMMARY OF THE INVENTION

It is, therefore, an object of the invention to provide a wet type clutch having double pistons which is constructed and arranged so as to reduce the axial length of the clutch per se.

It is a further object of the invention to provide a wet type clutch having double pistons which is constructed and arranged so that, when the clutch is incorporated between an engine and the output shaft of a hydraulic torque converter, the axial length of the assembly is reduced.

The first object is accomplished by arranging an annular disc spring of the clutch in series, in a direction perpendicular to the axis of the clutch, with circumferential wall surfaces of the double pistons which surfaces are in frictional contact with each other and are perpendicular to an engaging surface of a clutch disk of the clutch. The second object is accomplished by forming a central circular aperture through one of the double pistons, an outer piston to cut off a central portion of the outer piston and by offsetting inner portions of the other piston, an inner piston and a clutch housing of the clutch with respect to their outer portions and a clutch hub of the clutch with respect to a clutch disk thereof in the direction of the axis of the clutch.

BRIEF DESCRIPTION OF THE DRAWING

These and other features and advantages of the invention will become more apparent from the following detailed description taken in connection with the accompanying drawing which is a cross sectional schematic view of a preferred embodiment of a wet type clutch according to the invention which is incorporated between output shafts of an engine and a torque converter.

DESCRIPTION OF THE SPECIFIC EMBODIMENT

Referring to the drawing, there is shown a wet type or hydraulically actuated friction clutch according to the invention which is combined with a torque converter of a motor vehicle with an engine. The torque converter 10 includes a pump impeller 12, a turbine impeller 14, a stator impeller 16, a hollow stationary shaft or a sleeve 18 and an output or driving shaft or a driven shaft 20. The stator impeller 12 is mounted on the stationary shaft 18 through a one-way clutch 22. The hollow stationary shaft 18 is concentrically positioned on the driven shaft 20 so that an annular gap or passageway 24 is defined therebetween. The passageway 24 is alternately communicable with a pressurized hydraulic fluid source and a hydraulic fluid sump of a hydraulic control system (not shown). The pump impeller 12 has a pump impeller shell 26 to which it is fixedly secured. The pump impeller shell 26 is fixedly secured at an inner peripheral portion to a hollow shaft 28 by welding. The hollow shaft 28 surrounds the hollow stationary shaft 18 so as to form an annular gap or passageway 30 thereon. The passageway 30 communicates at one end with the pump impeller 12 or the interior of the pump impeller shell 26 and is alternately communicable at the other end with the pressurized hydraulic fluid source and the hydraulic fluid sump.

An extension shell 32 is fixedly secured at one end portion to an outer peripheral portion of the pump impeller shell 26 by welding. The extension shell 32 extends to partially surround the turbine impeller 14 so as to form an annular space or passageway 34 thereon and then extends away from the turbine impeller 14. The passageway 34 communicates with the interior of the pump impeller shell 26.

An output shaft or drive shaft 36 of the engine extends toward the driven shaft 20 and is formed at an end thereof with a blind bore 38. An intermediate shaft 40 is positioned between the drive shaft 36 and the driven shaft 20 and is tightly fitted at an end portion in the bore 38 of the drive shaft 36.

A converter cover 42 is fixedly secured at an inner circumferential end portion to the intermediate shaft 40 by welding and is connected or fitted at an outer circumferential portion or wall surface with or in the other end portion 43 of the extension shell 32. A torque converter chamber 44 is formed between the turbine impeller 14 and the converter cover 42 and communicates with the passageway 34. An annular seal member 45 is provided between the extension shell 32 and the converter cover 42 to seal the torque converter chamber 44 from the atmosphere. An adaptor ring 46 is positioned above the converter cover 42 and is fixedly secured to the end 43 of the extension shell 32 by welding. A starter ring gear 48 is fixedly secured to the adaptor ring 46 by a bolt 50 and engages a shoulder or step 52 formed on the outer circumferential portion of the converter cover 42. A drive plate 54 is fixedly secured at an inner circumferential portion to the drive shaft 36 by a bolt 56 and at an outer circumferential portion to the starter ring gear 48 by a bolt 58. As a result, the pump impeller 12 can be driven by the power of the engine.

The hydraulically controlled friction clutch, generally designated by the reference numeral 60, comprises a clutch housing 62 located in the torque converter chamber 44. The clutch housing 62 has a cylindrical wall 64 spaced from the internal circumferential wall surface of the converter cover 42 to form therebetween an annular space or path for hydraulic fluid flow and an annular bottom wall 66 fixedly connected at its external circumferential end portion to the cylindrical wall 64 and spaced from the turbine impeller 14. The cylindrical and bottom walls 64 and 66 define a cavity or chamber opening into the torque converter chamber 44 and toward the converter cover 42. The clutch housing 62 also has a hub portion 68 forming an inner portion of the bottom wall 66. The hub portion 68 is rotatably mounted at its inner circumferential end portion on the hollow stationary shaft 18 through a bearing 70 and the turbine impeller 14 is fixedly connected to the hub portion 68 by suitable fastening means such as, for example, a rivet 72. A clutch hub 74 is splined at its inner circumferential end portion 75 to the driven shaft 20 and is mounted on the intermediate shaft 40 and the clutch housing 62 through a pair of thrust bearings 76, respectively, so that the intermediate shaft 40, the clutch housing 62 and the clutch hub 74 all are rotatable relative to each other. A clutch disk 78 is splined at 79 to the outer circumferential end portion of the clutch hub 74 so as to be slidably movable axially of the driven shaft 20 for a forceful engagement with the clutch housing 62 and for release from the forceful engagement.

An inner piston 80 is located in the clutch housing 62 so that the clutch disk 78 is interposed therebetween. The inner piston 80 is mounted on the intermediate shaft 40 through an adaptor sleeve 82 so that it is slidably movable axially of the driven shaft 20 for attainment and release of the forceful engagement of the clutch disk 78 with the clutch housing 62 and it is rotatable relative to the intermediate shaft 40. The inner piston 80 is provided with an external cylinder surface or an external circumferential wall surface 84. The clutch 60 is thus interposed between the turbine impeller 14 and the driven shaft 20 in series therewith.

An outer piston 86 is slidably fitted on the external circumferential wall surface 84 of the inner piston 80 and is also slidably fitted in the internal circumferential wall surface of the cylindrical wall 64 of the clutch housing 62 so that it is movable axially of the driven shaft 20. A snap ring 88 is fixedly secured to the internal circumferential wall surface of the cylindrical wall 64 of the clutch housing 62 for limiting movement of the outer piston 86 away from the inner piston 80. The outer piston 86 is spaced from the converter cover 42 to form therebetween a path for hydraulic fluid flow.

The inner piston 80 is formed, at a side thereof which is opposite to the outer piston 86, with an annular aperture or groove 90 located laterally of the external circumferential wall surface 84 with respect to the axis of the driven shaft 20 or in series with the wall surface 84 in a direction parallel with an engaging surface of the clutch disc 78 and radially inwardly of the wall surface 84. An annular leaf spring or coned disk spring or diaphragm spring 92 slanted in the form of the surface of a cone frustum is located in the annular groove 90 so that it is seated at an outer circumferential end portion thereof on the outer piston 86 and at an inner circumferential end portion thereof on the inner piston 80 and urges the inner and outer pistons 80 and 86 away from each other. The size or length of the clutch 60 in the direction of the axis of the driven shaft 20 is reduced as compared with the case of a wet type clutch having a wall surface and an annular leaf spring, similar respectively to the wall surface 84 and the disc spring 92, which are arranged in series with each other axially of a driven shaft similar to the driven shaft 20. Each of the inner and outer pistons 80 and 86 has a wall surface 93 extending in parallel with the clutch disk 78 and located above or in series with the clutch disk 78 in a direction perpendicular to an engaging surface of the clutch disk 78. The wall surfaces 93 of the inner and outer pistons 80 and 86 engage or contact with each other when engagement of the clutch 60 is completed. The portion of the outer piston 86 seated by the annular disc spring 92 is also located above the clutch disk 78 axially of the driven shaft 20 and inner than the wall surface 93 of the outer piston 86.

The outer piston 86 is formed, at the inside of the seat portion seated by the outer end portion of the annular leaf spring 92, with a central circular aperture 94 so as to cut off the whole central portion inner than the seat portion seated by the disc spring 92. The diameter of the central circular aperture 94 can be increased as compared with the case of a wet type clutch in which a disc spring similar to the disc spring 92 is seated at its internal circumferential end portion on an outer piston. Each of the inner portion of the bottom wall 66 of the clutch housing 62 and the clutch hub 74 is offset or curved toward a reduced portion of the turbine impeller 14 which is near the stator impeller 16 so as to form a cavity or recess on the clutch hub 74. The inner piston 80 is curved from a portion near the inner end of the groove 90 into the cavity on the clutch hub 74 so that a cavity is formed on the inner piston 80. The converter cover 42 is offset or curved at an inner portion through the central circular aperture 94 of the outer piston 86 into the cavity on the inner piston 80 so that a cavity is formed on the converter cover 42. The end of the engine output shaft 36 and the intermediate shaft 40 both are located in the cavity on the converter cover 42. As a result, the distance between the engine output shaft 36 and the torque converter 10 is greatly reduced. In other words, the clutch 60 is greatly small sized axially of the driven shaft 20.

A common guide pin 96 is provided for guiding the inner and outer pistons 80 and 86. The guide pin 96 extends in bores formed respectively through the inner and outer pistons 80 and 86 and is fixedly supported by the clutch housing 62 at a position near the cylindrical wall 64. By locating the guide pin 96 near the wall 64 in this manner, it is possible to enlarge the diameter or size of the clutch disk 78 to effect an increase in the capacity of the clutch 60.

The outer piston 86 is formed therethrough with an aperture 98 opening into the torque converter chamber 44 between the converter cover 42 and the outer piston 86 and serving to communicate a chamber defined and sealed by the inner and outer pistons 80 and 86 at positions radially inwardly of the wall surface 84 and the annular disc spring 92 with the converter chamber 44 for preventing the movement of the inner and outer pistons 80 and 86 toward each other from being obstructed by the hydraulic fluid confined in the chamber.

The clutch hub 74 is formed therethrough with an aperture or passage 100 communicating the gap 24 between the hollow stationary shaft 18 and the driven shaft 20 with an inner chamber 102 defined between the clutch hub 74 and the inner piston 80. The inner piston 80 is formed with a radial aperture or passage 104 which communicates with an outer chamber 106, defined and sealed by the clutch housing 62 and the inner and outer pistons 80 and 86 at positions radially outwardly of the clutch disk 78 during the clutch engaging period when the clutch disk 78 is forcefully engaged with the clutch housing 62 by the inner piston 80, and the chamber 102. As a result, from the time when the inner piston 80 begins to push the clutch disk 78 against the clutch housing 62 to the time when engagement of the clutch disk 78 against the clutch housing 62 is completed, the hydraulic fluid in the chamber 106 is allowed to escape into the chamber 102 by way of the radial passage 104 to prevent movement of the inner piston 80 toward the clutch housing 62 from being impeded by the hydraulic fluid in the chamber 106 to make smooth engagement of the clutch 60 possible. The passage 100 serves to pass the hydraulic fluid escaped into the chamber 102 to the annular passageway 24 during the clutch engaging operation and to admit a pressurized hydraulic fluid from the annular passageway 24 into the chamber 102 during clutch releasing operation.

The outer piston 86 is formed therethrough with an orifice 108 which communicates with the torque converter chamber 44 between the converter cover 42 and the outer piston 86 and with the passage 104 in the inner piston 80. The orifice 108 serves to cause a portion of a pressurized hydraulic fluid fed into the torque converter chamber 44 to escape into the annular passageway 24 by way of the passage 104, the chamber 102 and the passage 100 to adjust the hydraulic fluid pressure acting on the outer and inner pistons 86 and 80 to prevent an undesirable shock produced during the clutch engaging period.

The hydraulically operated friction clutch 60 thus described is operated as follows:

When the pressure of hydraulic fluid in each of the torque converter chamber 44 and the interior of the clutch housing 62 is near zero or ineffective as when the engine fails to run, the annular disc spring 92 urges the inner and outer pistons 80 and 86 into positions in which the pistons 80 and 86 are most spaced from each other.

When the clutch 60 is engaged, the torque converter chamber 44 communicates with the pressurized hydraulic fluid source of the hydraulic control system through the annular passageway 30 so that it is fed with a hydraulic fluid pressure, while the chambers 102 and 106 in the clutch housing 62 communicate with the sump of the hydraulic control system through the annular passageway 24 so that the pressure of hydraulic fluid in the clutch housing 62 is reduced to a value equal to or near zero. As a result, the inner and outer pistons 80 and 86 both are moved rightwards in the drawing by the difference between the pressures outside and inside the clutch housing 62. At this state, when the inner piston 80 pushes the clutch disk 78 against the clutch housing 62 to start to engage the clutch 60, since the inner piston 80 substantially stops to move more rightwards, the outer piston 86 only is further moved rightwards, deflecting or compressing the annular leaf spring 92 and at the same time gradually increasing the clutch engaging force for pushing the clutch disk 78 against the clutch housing 62 due to increase in the biasing force of the annular leaf spring 92. As a result, a smooth clutch engaging operation is effected. When the outer piston 86 subsequently contacts with the inner piston 80 at the wall surface 93, the push of the clutch disk 78 against the clutch housing 62 is effected without the intermediation of the annular leaf spring 92. As a result, the clutch engaging force reaches the maximum value and the clutch engaging operation is completed.

When the clutch 60 is released, the torque converter chamber 44 communicates with the sump through the annular passageway 30 so that the pressure of hydraulic fluid in the converter chamber 44 is reduced to about zero, while the interior of the clutch housing 62 communicates with the pressurized hydraulic fluid source through the annular passageway 24 so that it is fed with a hydraulic fluid pressure. As a result, the inner and outer pistons 80 and 86 are moved leftwards in the drawing and accordingly the clutch disk 78 is freed from the forceful engagement with the clutch housing 62. The clutch disengaging operation is completed when the outer piston 86 is engaged with the snap ring 88 and the inner piston 80 is moved into a postion in which it deflects or compresses the annular disc spring 92 and contacts with the outer piston 86 at the wall surface 93 as shown in the drawing.

It will be thus appreciated that the invention provides a wet type clutch in which an annular leaf spring slanted in the form of a cone frustum and urging the inner and outer pistons away from each other is arranged in the inner piston, in a direction parallel with the clutch disk, in series with a wall surface of the inner piston through which the inner piston is slidably fitted in the outer piston so as to greatly reduce the length or thickness of the clutch per se in the direction of the axis of the clutch.

It will be further appreciated that the invention provides the wet type clutch in which the outer piston is formed therethrough with a central circular aperture to omit a central portion of the outer piston and an inner portion of each of the clutch housing, the clutch hub and the inner piston is offset or curved in the direction of the axis of the clutch and away from the outer piston to form a cavity on the inner portion of the inner piston for accommodating an end of the drive shaft of an engine so that when the clutch is incorporated between the drive shaft of the engine and the driven shaft of the torque converter, the length of the assembly is greatly reduced.

What is claimed is:

1. A wet type clutch comprising a clutch housing defining therein a chamber having;

an internal wall surface;

an outer piston in slidable contact with said internal wall surface of said clutch housing;

a clutch disk located in said clutch housing at a position radially inwardly of said outer piston and engageable with said clutch housing;

an inner piston located in said clutch housing between said outer piston and said clutch disk and having a wall surface through which said inner piston is slidably fitted in said outer piston for pushing said clutch disk against said clutch housing and for interrupting to push said clutch disk; and an annular disc spring slanted in the form of a surface of a frustum cone and interposed between said outer and inner pistons for urging them away from each other;

said annular disc spring being located in said inner piston in series with said wall surface thereof in a direction parallel with said clutch disk.

2. A wet type clutch as claimed in claim 1, in which said clutch disk has a clutch hub to which said clutch disk is splined, said clutch housing having an inner chamber defined between said inner piston and said clutch hub and radially inwardly of said clutch disk when said clutch disk is pushed against said clutch housing, and an outer chamber defined between said inner piston and said clutch housing and radially outwardly of said clutch disk when said clutch disk is pushed against said clutch housing, said inner piston having therethrough a radial passage communicating said outer chamber with said inner chamber.

3. A wet type comprising a clutch housing having an internal wall surface;

an outer piston in slidable contact with said internal wall surface of said clutch housing;

a clutch disk located in said clutch housing at a position radially inwardly of said outer piston and engageable with said clutch housing;

an inner piston located in said clutch housing between said outer piston and said clutch disk and having a wall surface through which said inner piston is slidably fitted in said outer piston for pushing said clutch disk against said clutch housing and for interrupting to push said clutch disk; and an annular disc spring slanted in the form of the surface of a cone frustum and interposed between said outer and inner pistons for urging them away from each other;

said annular disc spring being located in said inner piston in series with said wall surface thereof in a direction parallel with said clutch disk, said outer piston having a seat portion seated by said annular disc spring;

said outer piston being formed therethrough at a position radially inwardly of said seat portion with a circular central aperture to cut off a central portion of said outer piston.

4. A wet type clutch as claimed in claim 3, in which said clutch disk has a clutch hub to which said clutch disk is splined, an inner portion of each of said clutch housing, said clutch hub and said inner piston being offset in the direction of the axis of said clutch and away from said outer piston to define a cavity on said inner portion of said inner piston.

5. A wet type clutch as claimed in claim 3, in which said annular disc spring has an outer circumferential end portion seated on said seat portion of said outer piston, and an inner circumferential end portion seated on said inner piston.

6. A wet type clutch as claimed in claim 3, in which said clutch disk has a clutch hub to which said clutch disk is splined, said clutch housing having an inner chamber defined between said inner piston and said clutch hub and radially inwardly of said clutch disk when said clutch disk is pushed against said clutch housing, and an outer chamber defined between said inner piston and said clutch housing and radially outwardly of said clutch disk when said clutch disk is pushed against said clutch housing, said inner piston having therethrough a radial passage communicating with said outer chamber and with said inner chamber.

7. A wet type clutch in combination with an engine including a drive shaft, and a torque converter having a turbine impeller and a driven shaft, said wet type clutch being incorporated between said turbine impeller and said driven shaft and comprising a clutch housing having an internal wall surface;

an outer piston in slidable contact with said internal wall surface of said clutch housing;

a clutch disk located in said clutch housing at a position radially inwardly of said outer piston and engageable with said clutch housing;

an inner piston located in said clutch housing between said outer piston and said clutch disk and having a wall surface through which said inner piston is slidably fitted in said outer piston for pushing said clutch disk against said clutch housing and for interrupting to push said clutch disk; and an annular disc spring slanted in the form of the surface of a cone frustum and interposed between said outer and inner pistons for urging them away from each other, said annular disc spring being located in said inner piston in series with said wall surface thereof in a direction parallel with said clutch disk, said outer piston having a seat portion seated by said annular disc spring, said outer piston having therethrough at a position radially inwardly of said seat portion a circular central aperture to cut off a central portion of said outer piston, and an end of said drive shaft being accommodated in said circular central aperture.

8. A wet type clutch as claimed in claim 7, in which said clutch disk has a clutch hub to which said clutch disk is splined, an inner portion of each of said clutch housing, said clutch hub and said inner piston being offset in the direction of the axis of said clutch and away from said outer piston, said torque converter having a converter cover located above said outer piston and spaced from said outer piston and having an inner portion offset toward said inner portion of said inner piston to define a cavity on said inner portion of said converter cover, and said end of said drive shaft being accommodated in said cavity.

* * * * *